United States Patent [19]

Kossmehl et al.

[11] Patent Number: 4,617,143
[45] Date of Patent: Oct. 14, 1986

[54] OXIDIZING POLYMERIZATION WITH ASF$_5$

[75] Inventors: Gerhard Kossmehl, Berlin; Jürgen Hocker, Bergisch-Gladbach, both of Fed. Rep. of Germany

[73] Assignee: Bayer Aktiengesellschaft, Leverkusen, Fed. Rep. of Germany

[21] Appl. No.: 699,170

[22] Filed: Feb. 7, 1985

Related U.S. Application Data

[62] Division of Ser. No. 506,607, Jun. 22, 1983, abandoned.

[30] Foreign Application Priority Data

Jun. 29, 1982 [DE] Fed. Rep. of Germany ....... 3224159
Jun. 29, 1982 [DE] Fed. Rep. of Germany ....... 3234160

[51] Int. Cl.$^4$ ............................................. H01B 1/00
[52] U.S. Cl. ...................... 252/500; 252/518; 252/519; 252/520; 252/521; 525/398; 525/410
[58] Field of Search ............... 252/500, 518, 519, 520, 252/521; 525/398, 410

[56] References Cited

U.S. PATENT DOCUMENTS

| | | | |
|---|---|---|---|
| 4,374,048 | 2/1983 | Kim et al. | 252/518 |
| 4,501,686 | 2/1985 | Hotta et al. | 252/500 |
| 4,505,840 | 3/1985 | Kurkov | 578/363 |

FOREIGN PATENT DOCUMENTS 0035715 2/1981 European Pat. Off. .
0039827 4/1981 European Pat. Off. .
0053669 10/1981 European Pat. Off. .
1318437 5/1973 United Kingdom .

Primary Examiner—Joseph L. Schofer
Assistant Examiner—Bernard Lipman
Attorney, Agent, or Firm—Connolly and Hutz

[57] ABSTRACT

The invention relates to a process for the production of doped heterocyclic polymers, wherein sulphur-free heteroaromatic compounds are reacted with arsenic pentafluoride, optionally in the gas phase or in an inert organic solvent, at temperatures of from −20° C. to +80° C. (or the boiling point of the solvent), and to the doped heterocyclic polymers obtained according to this process, as well as to doped products of polymers according to the following formula

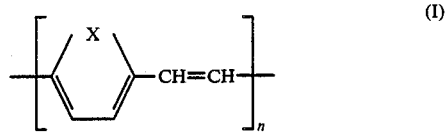

(I)

wherein
X=O or S, and
n an integer of >10,
and a process for the production thereof.

2 Claims, No Drawings

OXIDIZING POLYMERIZATION WITH ASF$_5$

This application is a divisional application of Ser. No. 506,607. filed June 22, 1983. now abandoned.

It is known that conductivity can be increased by doping suitable polymers with AsF$_5$.

The present invention relates to a process for the production of doped heterocyclic polymers which is characterized in that low molecular weight sulphur-free heteroaromatic compounds are reacted with arsenic pentafluoride, and to the polymers obtained by this process.

If low molecular weight sulphur-free heteroaromatic compounds (including those containing two or more heteroaromatic ring systems which may even be part of a conjugated $\pi$-electron system) are reacted with AsF$_5$ in accordance with the present invention, it is not the expected low molecular weight salts that are formed. Instead, conductive polymers are obtained by a combination of polymerisation and doping. The reaction of unsaturated 5-ring heterocycles with AsF$_5$ is particularly preferred. This reaction may be carried out, for example, with pyrrole, furan, pyrazole, imidazole or oxazole, which may be substituted by halogen, alkyl, alkoxycarbonyl or hydroxy, pyridine, 4,4'-bipyridyl and their substitution products, fused heterocycles and also with compounds in which aromatic, substituted aromatic or heteroaromatic ring systems are condensed with heterocycles. Doped polymers showing high electrical conductivity values are formed in every case.

In these reactions, AsF$_5$ may be used in apolar, absolutely anhydrous solvents, such as for example hexane, benzene, toluene, dichloromethane, 1,2-dichloromethane, or mixtures thereof both in air, nitrogen or argon at temperatures in the range of from $-20°$ C. to the boiling temperature of the particular solvent.

However, gaseous AsF$_5$ is preferably allowed to act on the solid, liquid or gaseous heterocyclic compound at temperatures in the range of from $-40°$ C. to $+120°$ C., the polymer according to the invention being obtained in the form of a black powder or a block film.

Some of the polymers obtained are highly stable both to atmospheric moisture and, in some cases, also to hydrolysis. Other polymers are completely or partly hydrolyzed to form the corresponding polyheteroarylenes by stirring for several hours with water, ethanol or 25% NH$_4$OH at room temperature. Where hydrolysis is carried out with NH$_4$OH, amination may also occur.

The structure of the polymers obtained is confirmed by elemental analyses, IR-spectra and also by mass-spectrometric examination.

Apart from the bands characteristic of the parent substances or polymers used, the IR-spectra of these polymers with their salt structure show the bands characteristic of AsF$_5$ for the heteroaromatic units.

The polymers according to the invention may be used as electrically conducting or semiconducting components, for example in panel-type heating elements, in electronic devices, as battery elements, in capacitors, for photovoltaic transducers and also for shielding against electromagnetic radiation. Subject of the invention are, furthermore, doped products of polymers according to the following formula:

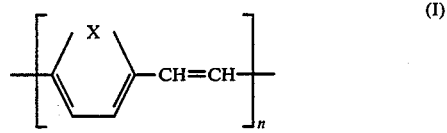

wherein
X=O or S, and
n an integer of >10,
and a process for the production thereof.

The starting materials poly(2.5-thiophendiylvinylene) and poly(2.5-furanediylvinylene) are generally known. The derivative of thiophenediyl can be obtained according to the method described in Makromol. Chem. 131, 15 (1970) and 131, 37 (1970) and the derivative of furanediyl according to base-catalysed autocondensation of 5-methylfurane-2-carbaldehyde.

It was found now that these polymers can be treated with commonly known dopants, e.g., with protonic acids such as H$_2$SO$_4$, ClO$_4$, H$_2$Cr$_2$O$_7$, HI, HNO$_3$, with Lewis acids such as SbCl$_5$, AsCl$_5$, TiCl$_4$, FeCl$_3$, SnCl$_4$ or with AsF$_5$ or with halogen, e.g., iodine. This treatment can, in general, be carried out by subjecting the polymers to either vapours or solutions of the doping agents. Mostly, one works at a temperature of from 10° to 30° C. and under exclusion of air and of moisture. The treatment may last for some hours or several days. The simplest method is to introduce a sample of the polymer and a sample of the dopant in an exsiccator, evacuates and let them pass. The effect of the doping can be seem from a change in colour of the samples. In general, the polymer is yellow to colourless. After doping, the colour of the polymer turns from darkbrown to black.

After doping the electrical conductivity of the products is increased by several orders of magnitude.

The polymers according to the invention can be used, e.g., in electrically conducting or semi-conducting building elements, in panel-type heating elements, in electronic devices, as battery elements, in condensators, for photovoltaic transducers, as well as for shielding against electromagnetic radiation.

EXAMPLES

EXAMPLES 1 to 12

General Procedure

The low molecular weight heterocycles are introduced into a vacuum vessel. The vessel is then evacuated and AsF$_5$ is introduced at room temperature. The AsF$_5$ pressure and contact time are shown in the following Table.

Black, insoluble and infusible powders or films are formed and may be removed from the wall of the reaction vessel.

TABLE

Examples 1 to 12

| Example No. | Starting material | AsF$_5$-pressure [Torr] | Reaction time [hours] | $\delta$ 298K [ohm$^{-1}$cm$^{-1}$] |
|---|---|---|---|---|
| 1 | pyrrole | 550 | 48 | $1.3 \times 10^{-4}$ powder |
| 2 | furan | 550 | 72 | $3.1 \times 10^{-8}$ (powder) |
| 3 | furan | 450 | 72 | $1.8 \times 10^{-1}$ (film) |

TABLE-continued

Examples 1 to 12

| Example No. | Starting material | AsF$_5$-pressure [Torr] | Reaction time [hours] | δ 298K [ohm$^{-1}$cm$^{-1}$] |
|---|---|---|---|---|
| 4 | pyridine | 450 | 72 | 1.8 × 10$^{-10}$ powder |
| 5 | 4,4'-bipyridyl | 500 | 24 | 3.4 × 10$^{-9}$ powder |
| 6 | 1-methylimidazole | 900 | 12 | 1 × 10$^{-7}$ powder |
| 7 | ⟨O⟩—CH=CH—C(=O)—CH$_3$ | 300 | 24 | 6.4 × 10$^{-6}$ film |
| 8 | ⟨O⟩—CH$_2$—OH | 900 | 24 | 6.3 × 10$^{-6}$ film |
| 9 | ⟨N-CH$_3$⟩ | 900 | 24 | 6 × 10$^{-5}$ powder |
| 10 | α-picoline | 900 | 24 | 2 × 10$^{-6}$ powder |
| 11 | β-picoline | 800 | 24 | 6 × 10$^{-8}$ powder |
| 12 | γ-picoline | 900 | 24 | 5.3 × 10$^{-7}$ powder |

EXAMPLE 13

10 parts by weight of polythiophenediylvinylene and 20 parts by weight of iodine are introduced into a vacuum vessel and allowed to react. After 24 hours, the colour of the polythiophenediylvinylene has changed to black. 18 parts by weight of doped polythiophenediylvinylene are obtained, having a specific conductivity of $2 \times 10^{-4} \Omega^{-1}$ cm$^{-1}$.

EXAMPLE 14

Analogously to Example 13, 10 parts by weight of polyfuranediylvinylene and 20 parts by weight of iodine are allowed to react. 16.5 parts by weight of a doped product are obtained, having a specific conductivity of $2 \times 10^{-3} \Omega^{-1}$ cm$^{-1}$.

EXAMPLE 15

10 parts by weight of polyfuranediylvinylene and 12 parts by weight of gaseous AsF$_5$ are introduced into a vacuum vessel. The colour of the product changes to black immediately. After 8 hours, 18.5 parts by weight of a doped product are obtained, having a specific conductivity of $6 \times 10^{-1} \Omega^{-1}$ cm$^{-1}$.

EXAMPLE 16

10 parts by weight of polythiophenedivinylene are introduced into a vacuum vessel, having an excess of HClO$_4$ (in separate vessels). After 30 days, 14.5 parts by weight of a dark-coloured powder are obtained, having a specific conductivity of $4.8 \times 10^{-8} \Omega^{-1}$ cm$^{-1}$.

We claim:

1. Doped products comprising polymers according to the formula:

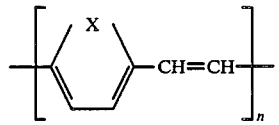

wherein
X is O or S, and
n is an integer greater than 10,
which have been doped with a protonic acid, a Lewis acid or halogen.

2. Process for the production of doped products by doping polymers according to the formula:

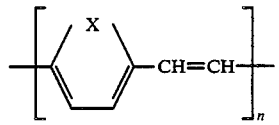

wherein
X is O or S, and
n is an integer greater than 10,
which comprises subjecting said polymers to doping with vapors or solutions of protonic acids, Lewis acids or halogen at a temperature from 10° to 30° C. with exclusion of air and of moisture whereby doping of said polymer is achieved.

* * * * *